Jan. 23, 1951     J. E. CLELAND ET AL     2,538,898
METHOD FOR PRODUCING PROTEIN HYDROLYSIS PRODUCT
Filed Oct. 13, 1948
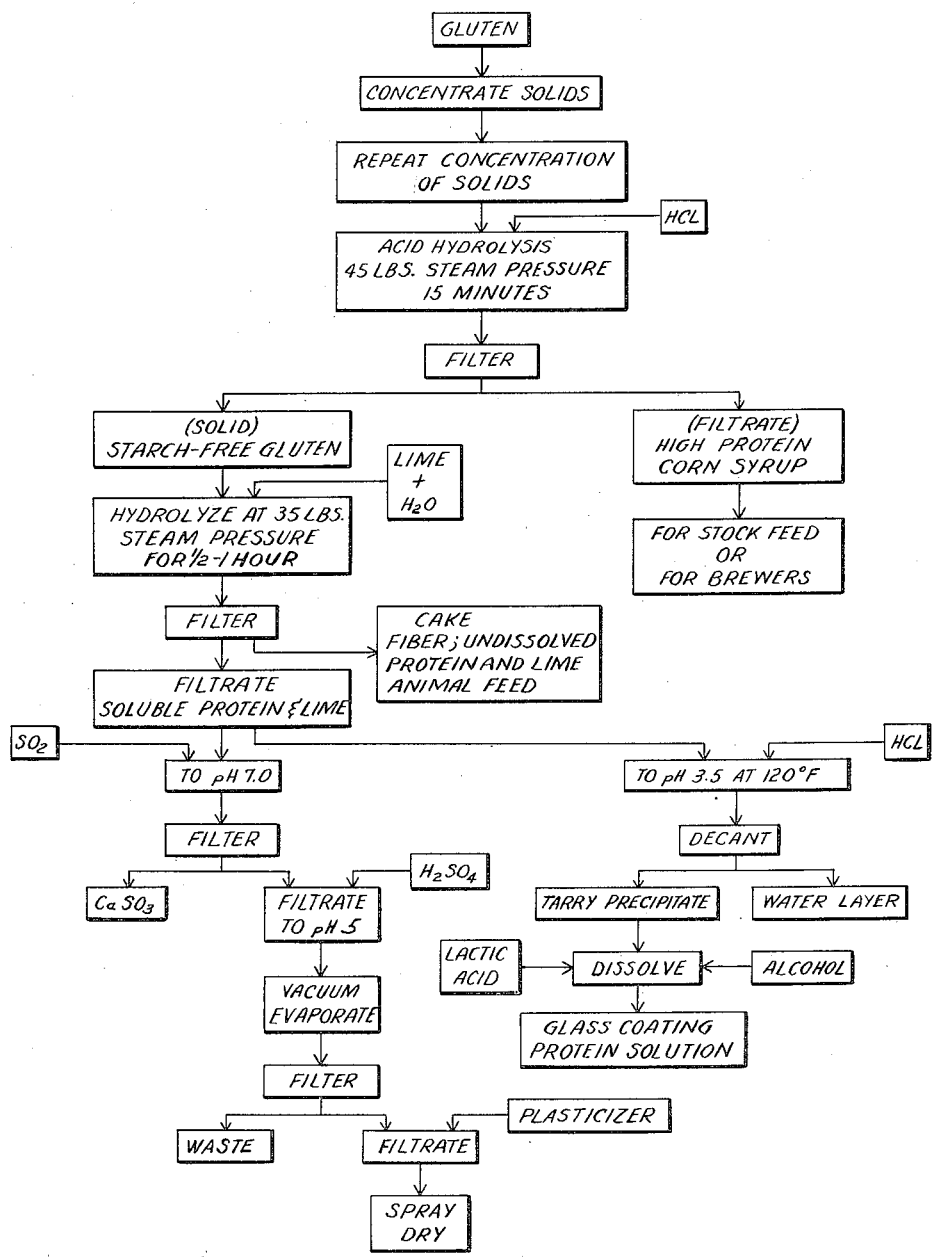
INVENTOR.
JAMES E. CLELAND
ELMER HENKE
BY Greene & Durr
ATTORNEY

UNITED STATES PATENT OFFICE 2,538,898

METHOD FOR PRODUCING PROTEIN HYDROLYSIS PRODUCT

James Edwin Cleland, Granite City, and Elmer Henke, Collinsville, Ill., assignors to Union Starch & Refining Company, Columbus, Ind., a corporation of Indiana Application October 13, 1948, Serial No. 54,344

4 Claims. (Cl. 260—112)

This invention relates to a process of making a protein product which can be employed as an addition product in the treatment of leather products and to the product so produced.

An object of the invention is to provide a process for producing a product from protein which can be added to leather products to improve the properties of the leather.

Another object of the invention is to provide a product from protein which can be added to leather products to improve the properties of the leather.

Another object of the invention is to provide a process for producing a product from protein which is soluble in aqueous solutions and which is precipitated from the aqueous solutions by tannin or tannic acid.

Another object of the invention is to provide a product from protein which can be added to leather products in soluble form and then be made insoluble.

Another object of the invention is to provide a process for producing a slightly hydrolyzed protein product which is adherent to glass.

Another object of the invention is to provide a process for producing a slightly hydrolyzed protein product which is insoluble in water, but soluble in the lower alcohols, as methyl and ethyl, that have been diluted with 10% to 20% water and soluble in dilute aqueous solutions of ammonia or sodium carbonate and which is adherent to glass.

These and other objects are attained by hydrolyzing a purified gluten which is substantially free from starch with lime as a catalyst under steam pressure, then neutralizing and purifying the hydrolyzed product to remove the undesirable products introduced during the hydrolyzing and neutralizing steps.

The novel features characteristic of this invention are set forth with particularity in the appended claims. The invention itself, however, both as to its organization and its method of operation together with additional objects and advantages thereof, will best be understood from the following description of specific embodiments when read in connection with the accompanying drawings which is a flow sheet of the new process.

As illustrated in the drawing, the following steps are carried out on commercial gluten products to produce the leather treating product of this invention:

1. The solids from a commercial gluten are concentrated several times and the gluten is dewatered by centrifuging, settling or filtering.

2. Acid is added to the concentrated product in sufficient quantity to give it a pH of 2 to 2.7 preferably about pH 2.1. The mix is then hydrolyzed in an acid resistant converter at a steam pressure of 30 lbs. to 45 lbs. This product is neutralized to a pH of 4.5 with an alkaline material such as caustic or lime and the product is filtered and washed to remove the solubilized starch conversion products, etc.

3. Water and lime (CaO or Ca(OH)$_2$) are added to the starch free product to give a pH of 9 to 13.5 preferably about pH 11.8 and this mix is hydrolyzed at a steam pressure of 25 lbs. to 45 lbs. for ⅓ hr. to 2½ hrs. The hydrolyzed liquid product is then filtered. The cake from this step is used as a component in animal feed. For the production of leather treating protein the hydrolysis is preferably conducted at 35 lbs. steam pressure for one hour.

The lime hydrolysis gives a more uniform and selective hydrolysis of corn gluten than acids or strong alkalies. It is selective in dissolving and hydrolyzing the zein-like protein of corn. This portion of the protein may at the same time be hydrolyzed to any degree desirable. This type hydrolysis gives a water soluble protein at a pH of 4.5 or higher and retains desirable plastic properties.

The use of alkalies as NaOH, KOH, and Na$_2$CO$_3$ for hydrolysis leaves slimy residues that coat on the filter. This makes filtering very difficult. During the alkaline hydrolysis the fatty acids in the protein are freed from the glycerides. Reagents as KOH, NaOH, or Na$_2$CO$_3$ saponify the fatty acids freed in the hydrolysis. These are soluble and do not filter out and therefore give trouble in the next steps of the process. With the use of lime these difficulties are eliminated. The lime hydrolysate filters easily, and lime forms an insoluble soap with the liberated free fatty acid and is easily filtered out. The lime also absorbs a large quantity of the carotinoids giving a lighter colored product.

4. Sulfur dioxide is bubbled through the filtrate from step 3 until the pH of the liquor is reduced to a pH of 7.3. The precipitated calcium sulfite is filtered off.

The removal of lime by passing SO$_2$ gas through is important for the following reasons:

a. Gives a crystalline precipitate of CaSO$_3$ that filters easily.

b. Gives lower ash on finished product. (More complete removal of calcium.)

c. Eliminates scaling of evaporator tubes which is encountered if calcium is removed with (SO$_4$) ions.

d. It eliminates toxic and offensive odors.

The removal of lime from the liquor by using sulfur dioxide gas gives a crystalline precipitate that is easily filtered. On the other hand the removal by precipitating as sulphate or phosphate or combination of the two gives a slimy precipitate that stops the flow of a filter.

The alkaline hydrolysis breaks up some of the sulphur proteins as methionine, cystine, etc., liberating CaS. On acidifying there is $H_2S$ gas liberated. This gas is toxic, corrosive to some metals and disagreeable smelling. The addition of the $SO_2$ gas converts the calcium sulphide to calcium thiosulphate eliminating this problem.

5. The filtrate from step 4 is adjusted to a pH of 7.0 to 4.0 preferably 6.5 with an acid, for example, sulfuric acid, and the product is vacuum evaporated to 20° Bé. This liquor is filtered. A plasticizer, for example, lactic acid is added and the liquor is dried. After the addition of the plasticizer a small amount of an oxidizing agent, for example, hydrogen peroxide may be added to improve the odor of the product.

If a glass coating protein is desired in place of the leather treating protein the hydrolysis of step 3 is preferably conducted at 35 lbs. of steam pressure for only ½ hour and the filtrate resulting from this step containing dissolved protein and lime, is treated with hydrochloric acid to obtain a pH of about 3.5 and the temperature of the liquor is raised to 120° F. The water layer is then decanted from the tarry precipitate. This tarry precipitate is dissolved in alcohols, preferably the lower numbers of the aliphatic series such as methyl, ethyl, etc. A plasticizer, such as lactic acid, may be added to the solution. This solution is then ready for coating glass. If desired a dye may be added to the solution.

The present invention is applicable to any vegetable or animal proteins of sufficient purity which are appreciably soluble in mild alkaline solutions and may include protein or gluten from wheat, Kaffir corn, milo maize, soybeans, hide scraps, or corn (Zea Mays L.). The gluten from corn is much preferred on the basis of economic considerations, yield, and properties, and particularly the high grade gluten as manufactured in the corn wet milling industry.

The plasticizers which may be employed in the final protein product include any of the known plasticizers for proteins such as lactic acid, propylene glycol, glycol esters, etc.

The following examples illustrates how the process is carried out.

*Example 1*

The corn gluten is obtained from the gluten discharge of the centrifuge used in the wet milling of corn. The liquor is concentrated to 25% dry substance by filtration. More dilute liquors work just as well, however, more concentrated liquor eliminates the handling of large volumes. The mixture in the present example had 1270 lbs. of dry substance with 47% protein ($N \times 6.25$) content. The mixture is run into an acid resistant converter equipped with a mechanical stirrer. The mixture is adjusted to a pH of 2.1 by adding the required quantity or approximately 43 lbs. of 50% $H_2SO_4$. The mixture is heated to 40 lbs. internal pressure by injection of live steam. This pressure is maintained 15 minutes. The pressure is then released and the mixture is neutralized with soda ash to a pH of 4.5. This required 35 lbs. soda ash.

The neutralized mixture is filtered and the cake is washed free of hydrolyzed starch in a filter press. The cake in the press is air blown for a few minutes to make the removal of the cake less difficult.

Three hundred gallons of water and 150 lbs. of lime ($Ca(OH)_2$) are added to the converter. With the stirrer running, the starch-free gluten from the filter press is added. The converter is heated to 35 lbs. steam pressure. The heating is done by injecting live steam into the mixture. After heating for 1 hour the pressure is released. The mixture is filtered through a filter press and the press cake is washed with water. The filtrate has a pH of 11.8.

The filtrate containing the dissolved protein is treated with sulfur dioxide gas to remove the dissolved lime. Passing $SO_2$ gas through the solution precipitates $CaSO_3$. Care must be exercised not to add a large excess of $SO_2$. Excess $SO_2$ will convert insoluble $CaSO_3$ to soluble $Ca(HSO_3)_2$. About 30 lbs. of $SO_2$ gas was added. The pH of the liquor after the addition of $SO_2$ was 7.2. The calcium sufite is filtered off. The liquor is adjusted to a pH of 6.5 with sulfuric acid (50%) then it is vacuum evaporated to a density of 20° Bé. at 100° F. Sufficient lactic acid is added to give a final product containing 1½% lactic acid on the dry substance basis. After the liquor cools to 90° F. a small quantity of hydrogen peroxide is added to improve the odor (about 150 cc. of 30% $H_2O_2$). This material can then be spray dried.

The dried product is a pale yellow powder of slight odor. It is soluble in aqueous solvents having a pH of 4.5 or more. It is also soluble in aqueous ammonium chloride or ammonium sulfate solutions. The powder contains 6.3% of water, has an ash content of 2% and has a protein content of 80% estimated on the nitrogen content ($N \times 6.25$).

A water solution of the product is precipitated by tannic acid at a pH of 5 or less. The tannic acid precipitate gives a plastic mass when heated to 80° C. The tannin precipitate is soluble in ethyl alcohol or acetone.

This product makes a valuable additional product to leather. It can be added to the leather in a soluble form then made insoluble. This protein combines with the tannin and does not change the ash, protein and tannin ratio of leather.

*Example 2*

A corn gluten is washed and the starch is removed by acid hydrolysis as in Example 1. The solid starch-free product is then dispersed in water and lime is added to give the mix a pH of 11.8. This mix is hydrolyzed at 35 lbs. steam pressure for ½ hour. The resultant liquor is filtered and washed and the filtrate and wash water containing lime and soluble protein are combined. This combined liquor is treated with HCl in sufficient quantity to give a pH of 3.5 and the temperature is raised to 120° F. and maintained at this temperature for 15 minutes. The liquor is allowed to settle and the water layer is decanted from the tarry precipitate. This tarry precipitate is dissolved in denatured ethyl alcohol to produce a solution containing about 36% solids. About 8.5% of lactic acid based on the weight of the protein is added.

The product is an alcohol solution of a slightly hydrolyzed corn protein. After spraying on glass it leaves a transparent film that adheres to glass on drying. The protective film is insoluble in water, but dissolves in dilute ammonia or dilute sodium carbonate solution. For example, it can be applied in conjunction with a dye for coating backs of photographical plates to prevent a halo effect. It is easily removed from the plate after exposure by washing in dilute sodium carbonate solution.

We claim:

1. In a process for manufacturing a light colored, plastic protein hydrolysis product from vegetable proteins which contain no starch and no starch conversion products as impurities, the steps comprising, adding lime and water to the protein to give a composition having a pH of 9–13.5, hydrolyzing the resultant composition under steam pressure of 25–45 pounds for from 1/3–2 1/2 hours, filtering the resultant composition, precipitating the alkaline earth metal ions introduced by said lime by bubbling $SO_2$ gas through the mix, filtering the product to eliminate undissolved protein and the precipitated compounds, and concentrating the resultant dissolved protein hydrolysate.

2. In a process for manufacturing a light colored, plastic protein hydrolysis product which is soluble in water and precipitatable from aqueous solutions by tannin or tannic acid from corn gluten which contains no starch and no starch conversion products as impurities, the steps comprising adding lime and water to said starch-free corn gluten to give a composition having a pH of 9–13.5, hydrolyzing the resultant composition under steam pressure of 25–45 pounds, filtering the resultant composition, precipitating the alkaline earth metal ions introduced by said lime by bubbling $SO_2$ gas through the mix, filtering the product to eliminate undissolved protein and the precipitated compounds, acidifying the filtrate to a pH of 7–4 and concentrating the resultant dissolved protein hydrolysate.

3. A process for manufacturing a light colored, plastic protein hydrolysis product from corn gluten, said product being soluble in water and precipitatable from aqueous solution by tannin or tannic acid comprising the steps of freeing the gluten of starch, adding lime and water to give a composition having a pH of 11.8, hydrolyzing the resultant composition under steam pressure of 35 pounds for 1 hour, filtering the resultant composition, precipitating the alkaline earth metal ions introduced by said lime by bubbling $SO_2$ gas through the mix, filtering the product to eliminate undissolved protein and the precipitated compounds, acidifying the filtrate to a pH of 6.5 and drying the resultant product.

4. A process for manufacturing a light colored, plastic protein hydrolysis product from corn gluten comprising the steps of freeing the gluten of starch, adding lime and water to give a composition having a pH of 11.8, hydrolyzing the resultant composition under steam pressure of 25–45 pounds for 1/2 hour, filtering the resultant composition, acidifying the filtrate to a pH of 3.5 thereby producing a tarry precipitate, separating said precipitate and dissolving the protein of said tarry precipitate in alcohol.

JAMES EDWIN CLELAND.
ELMER HENKE.

REFERENCES CITED

The following references are of record in the file of this patent:

UNITED STATES PATENTS

| Number | Name | Date |
|---|---|---|
| 2,271,620 | Brier et al. | Feb. 3, 1942 |
| 2,324,951 | Ratzer | July 20, 1943 |
| 2,361,057 | Ratzer | Oct. 24, 1944 |
| 2,383,252 | Huntzicker | Aug. 21, 1945 |
| 2,397,307 | Youtz | Mar. 26, 1946 |
| 2,414,195 | Evans et al. | Jan. 14, 1947 |
| 2,448,002 | Pearce | Aug. 24, 1948 |